Oct. 30, 1962 C. E. BARNES 3,061,140
BRUSH WIPER
Filed May 19, 1960 2 Sheets-Sheet 1
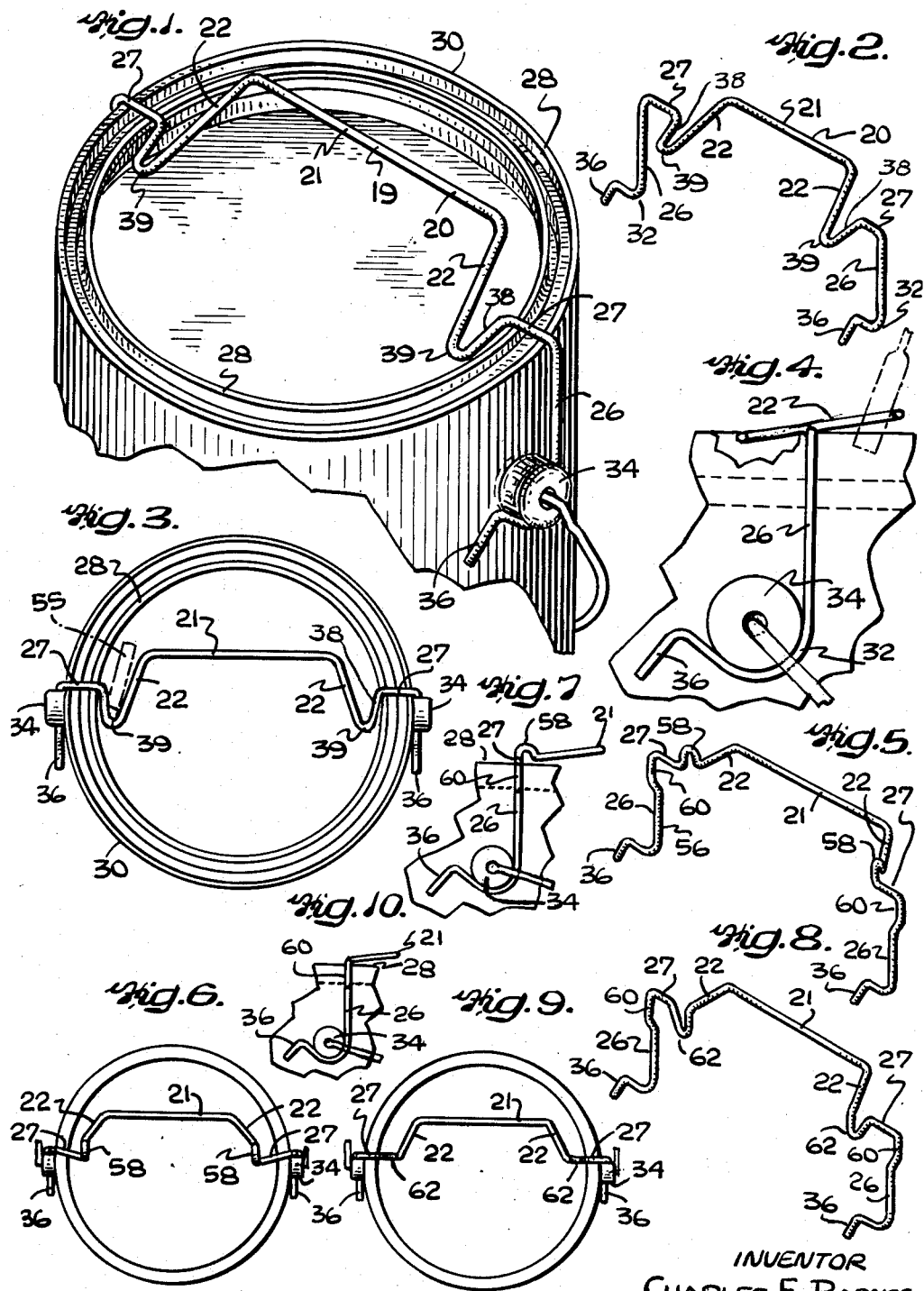
INVENTOR
CHARLES E. BARNES
BY Peter J. Catane
HIS ATTORNEY Oct. 30, 1962 C. E. BARNES 3,061,140
BRUSH WIPER
Filed May 19, 1960 2 Sheets-Sheet 2
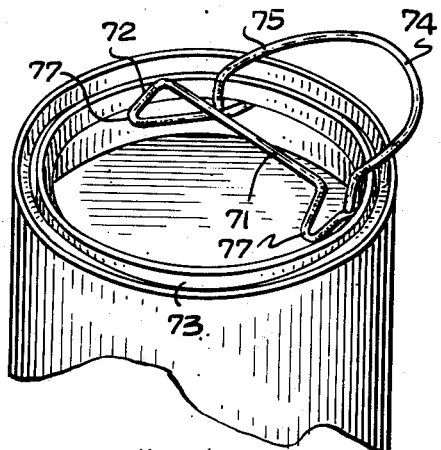
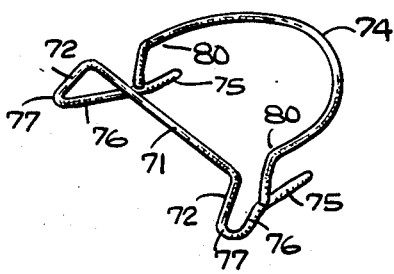
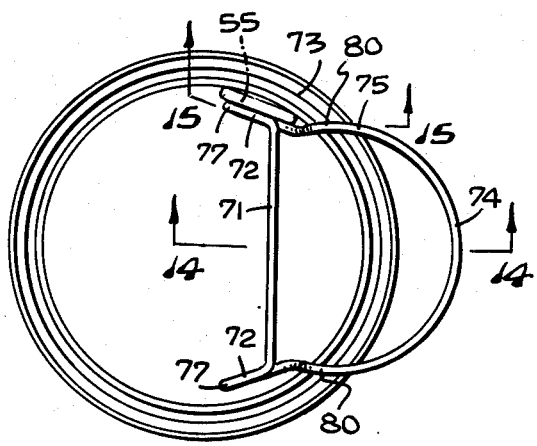
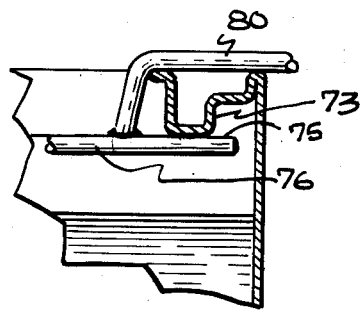
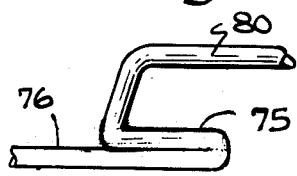
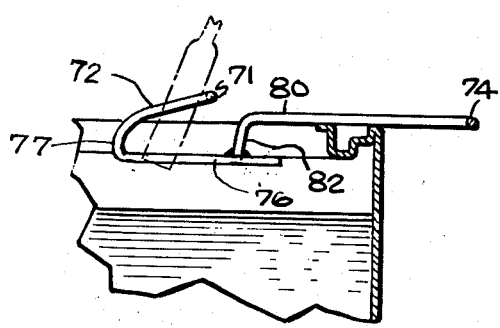
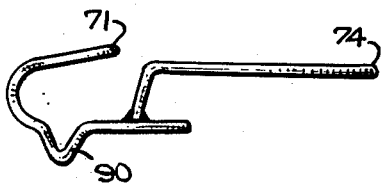
INVENTOR.
CHARLES E. BARNES
BY
HIS ATTORNEY

United States Patent Office 3,061,140
Patented Oct. 30, 1962

3,061,140
BRUSH WIPER
Charles E. Barnes, 4320 Osage Ave., Philadelphia 4, Pa.
Filed May 19, 1960, Ser. No. 30,352
5 Claims. (Cl. 220—90)

My invention relates to paint brush wipers and, more particularly, to an improved paint brush wiper having a wiping bar constructed and positioned so as to prevent the excess paint from being placed on the rim of the can or inadvertently brushed onto the rim during the wiping motion.

During the wiping motion, it is important that the brush not come into contact with the rim or the side of the can. Since it is desirable to support the brush wiper by the rim, for convenience and economy, my brush wiper is constructed, in one embodiment, having a wiping bar supported by leg portions which partially rest upon the rim but which space the wiping bar vertically above the level of the rim of the can. In this way, at the end of the wiping motion the tip of the brush is disposed above the level of the rim of the can and there is no tendency for the brush and the can to come into contact with each other.

Some of the brush wipers, heretofore known, have had the disadvantage of not being capable of being attached to the paint can when the cans are shipped from the factory. Attaching the wiper to each can at the factory is desirable as a convenience to the paint manufacturer and to the retailer thereof. In certain embodiments of my improved wiper, after the lid is secured to the can, the brush wiper may be attached thereto and shipped with the can.

This improved wiper has the further advantage of biasing the lid into engagement with the rim of the can so that in transit the lid cannot become loose, because the brush wiper will retain it in proper position.

Another feature of my invention is the forming of the supporting legs so that they, with portions of the wiping member, form inverted U-shaped members to facilitate the return of the excess paint (removed from the brush) to the can.

A still further object of my invention is to provide means for securing the brush wiper to the can provided by portions remote from the rim, so that the hands of the user will not come in contact with the paint, hence paint will not be transferred from the hands to the brush handle.

One other object of my invention is to provide a brush wiper adapted to simultaneously wipe the width and the edges of the brush.

In one embodiment of my invention a U-shaped wiping member is supported by leg portions so that the base of the U is vertically above and horizontally spaced from the rim but is disposed over the opening of the can. Alternately, the legs may be supported by the rim exclusively, or by the bail bearings (ears) and the rim.

The foregoing and other objects of my invention, the principles of my invention, and the best modes in which I have contemplated applying such principles will more fully appear from the following description and accompanying drawings in illustration thereof.

In the drawings,

FIG. 1 is a perspective view of my improved brush wiper adapted for attachment to a can having a handle and handle bearings, showing only a part of the can with the lid thereof removed;

FIG. 2 is a perspective view of the brush wiper illustrated in FIG. 1 when removed from the can;

FIG. 3 is a top view of the brush wiper and can illustrated in FIG. 1, but also showing a paddle in dot-dash lines;

FIG. 4 is a partial side view of the brush wiper and can illustrated in FIG. 1 and showing a brush in dot-dash lines;

FIG. 5 is a perspective view, similar to FIG. 2, but illustrating a modification of my invention;

FIG. 6 is a top view of the modified wiper illustrated by FIG. 5;

FIG. 7 is a partial side view of the modified wiper illustrated by FIG. 5 when attached to a can;

FIGS. 8, 9 and 10 are similar to FIGS. 5, 6 and 7, respectively, but illustrating a further modification of my brush wiper;

FIGS. 11, 12, 13 and 14 are similar to FIGS. 1, 2, 3 and 4 but illustrate a modification of my brush wiper adapted for use with a can not having handle bearings;

FIG. 15 is an enlarged fragmentary view of the connection to the can in the embodiment illustrated by FIGS. 11 to 14; and FIGS. 16 and 17 are fragmentary views illustrating modifications of the brush wiper shown in FIGS. 11 to 14 inclusive, directed to the connections between the wiping member and the supporting member.

Referring to the drawing, and particularly to FIGS. 1 to 4, inclusive, my improved brush wiper 19 is formed from a circular wire (in cross-section) and bent to form a generally U-shaped wiping member 20 having a rectilinear bar 21 and inclined sides 22. The wire is further bent to form supporting legs 26 connected to each side 22. The supporting legs 26 have horizontal portions 27 adapted to lie upon the circular rim 28 defining the mouth or opening of the circular can 30 with which the wiper is associated. (The can is of the usual type having a lid, not illustrated, with an annular projection for engaging the rim.) The vertical portions of the legs 26 have lower portions curled to form engaging resilient clamps 32 for firmly clasping the handle (bail) bearings or ears 34 for the handle (bail) of the can. The terminal portions 36 projecting from the clamps 32 provide tabs by which the wiper may be engaged or disengaged from the handle bearings, by manually applying pressure thereto in the appropriate direction.

Between the overlying portions 27 and the sides 22, the wire is bent to form slanted and curved portions 38 which together with portions of the sides 22 form generally inclined U-shaped drip inducing members 39 extending in the direction opposite to that of the U-shaped wiping member but in approximately the same plane.

The various parts of the brush wiper are proportioned with respect to the can and rim so that when the wiper is attached to the can, the U-shaped wiping member 20 will be spaced horizontally from the rim 28. Also, the bar 21 and portions of the sides 22 will be spaced vertically above the level of the rim 28 but over the opening of the can. The lowest portions of the drip members 39, formed by the bases of the U-shapes (between the sides 22 and the overlying portions 27), however, lie below the upper level of the rim, to prevent paint from entering the rim. Also, the portion 39 is horizontally spaced from the rim, as seen in FIG. 3.

The brush wiper 19 may be constructed from circular wire having sufficient rigidity to suitably withstand the wiping pressure and sufficient spring qualities to firmly engage the handle bearings or ears 34. For gallon size cans, the brush wipers are made to accommodate 4 inch brushes by making the bars 21 about 3¾ to 3⅞ inches in length so that when the sides of the brushes are pressed against the bars 21 the edges thereof will automatically be wiped also. The sides 22 are inclined away from each other to facilitate entrance of the brush but the sides are maintained between a 90 to 110 degree angle with the bar 21 to facilitate the wiping of the brush edges.

To provide additional support for the brush wiper, the legs 26 are constructed so that the portions 27 rest upon the rim 28. The brush wiper is made from a wire sufficiently rigid that at all times during the wiping motion the bar 21 remains above the level of the rim 28. In this way when the brush leaves the bar 21 at the end of the wiping motion, there will be no tendency for the brush, loaded with paint, to touch the rim 28 thereby keeping the rim from filling with paint and then running down outside of the can.

As illustrated in FIG. 3, a paddle 55 may be wedged in the U-shaped drip inducing portions 39, when not in use.

The bar 21 is disposed to one side of the center of the can to lie in a chord of the arc of the rim, providing a large open space for stirring.

Thus, after the brush has been dipped in the paint within the can, it is withdrawn with a vertical motion while biasing the bristles against the bar 21 and sides 22. The withdrawal motion is continued and when the excess paint has been removed at the end of the motion, the brush is away from all portions of the can, thus preventing the excess paint from entering the grooves formed by the rim or otherwise being placed upon the inner or outer portions of the can. The excess paint flows down the slanted sides 22 and drips from the base of the U-shaped members 39 into the can.

In the modification illustrated by FIGS. 5 and 7, inclusive, the brush wiper is constructed generally similar to that described in connection with FIGS. 1 to 4, inclusive, but the legs 26 are constructed with inverted U-shaped drip inducing portions 58 between the portions 27 that overlie the rim and the juncture of the legs with the sides 22 of the U-shaped wiping member. The U-shaped portions 58 are aligned with the sides 22 in this embodiment. Also, if the can with which the brush wiper is to be utilized has an annular projection at the rim, the legs may be offset, as indicated at 60, to accommodate the annular projection.

In the modification illustrated by FIGS. 8 to 10, inclusive, the brush wiper is constructed generally similar to that described in connection with FIGS. 5 to 7, except that the drip inducing portions 62 are of U-shape and aligned with the portions 27 which overlie the rim, the bottom of the U of the portions 62 being disposed below the upper level of the rim 28.

In the embodiments illustrated by FIGS. 5 to 10, inclusive, paddles (not illustrated) may be wedged between the sides 22 of the wiping member and the rim 28 of the can, if desired.

A further modification is illustrated by FIGS. 11 to 14, inclusive, adapted especially for cans without ears or handles. In this embodiment the U-shaped wiping member also comprises a rectilinear bar 71 having inclined sides 72 at angles thereto of between 90 and 110 degrees. The bar 71 is also horizontally spaced from and vertically above the level of the rim 73, as illustrated in FIG. 14. This brush wiper, however, is provided with a supporting structure 75 which provides the dual function of securing the wiper in proper position and, also, provides an arcuate handle 74 for the can.

The support structure 75 comprises legs 76 which together with the sides 72 form inclined U-shapes, as illustrated in FIG. 14, to provide a curved drip inducing portion 77.

As illustrated in the drawings, the handle 74 is, prior to assembly, a separate piece having an arcuate portion, suitable for grasping by the user, and bent, L-shaped, resilient end portions 80. The end portions 80 together with the ends of legs 76 are proportioned, as illustrated in FIG. 15, for frictional engagement with the upper and lower surfaces of the rim 73. An inverted T connection is made between the ends 82 of the handle 74 to the legs 76, as illustrated, by welding the two.

If desired, this brush wiper may be made from one piece of wire, bent as disclosed, but modified so that the juncture between legs and support is formed by bending the wire upon itself, as illustrated in FIG. 16. The terminal ends of the wire are, preferably, brought into abutment at the middle of the arcuate handle 74 (not illustrated) and, if desired, welded or soldered at this place.

Another modification, illustrated by FIG. 17, may be constructed providing the leg with a depending U-shaped drip inducing portion 90 substantially below the lower surface of the rim. Also, a T connection is made between the handle member and the wiping member, in this embodiment.

From the foregoing, it will be evident that the embodiments described in connection with FIGS. 1 to 7, inclusive, may be added to the cans after the cans have been filled with paint and the lids secured thereto. The brush wipers will tend to bias and maintain the lids upon the can, providing a safety factor, preventing the lids from coming loose.

In connection with the embodiments illustrated by FIGS. 11 to 17, inclusive, it is evident that a relatively flat brush wiper is provided which can be conveniently secured by tape to the lid prior to shipping the can. Also, such a configuration lends itself to attaching to cardboards and display racks for convenient vending in retail establishments.

All of the embodiments provide a wiping member having a wiping bar positioned above the level of the rim so that at the end of the wiping motion the tip of the brush has no tendency to engage the can.

Also, all of the embodiments provide sides 72 having the major portion of their lengths also above the level of the rim of the can, to prevent the edges of the brushes from contacting the can.

It will be noted that by properly proportioning the various parts of the brush wipers, that either the frictional engagement between the parts that rest on the rim 28 and the parts that engage the underside of the rim; or the frictional engagement between the parts that rest on the rim 28 and the parts that engage the underside of the ears 34 will retain the brush wipers in proper position.

In connection with the embodiments illustrated by FIGS. 11 through 17, inclusive, if the upper surface of the inner annular wall defining the rim lies horizontally below the upper surface of the outer annular wall, as it does in some cans (not illustrated), the engagement of the brush wiper with such a rim will slope the entire brush wiper toward the opening of the can to facilitate dripping of the paint wiped off the brush back into the can.

Having described my invention, I claim:

1. In combination, a paint can having a rim defining an opening and adapted to frictionally retain a lid, said rim having upper and lower surfaces, and a paint brush wiper for use with said paint can, said brush wiper comprising a longitudinal wiping bar over the can opening, above the level of the rim, and with its ends laterally spaced from the rim, two wiping sides laterally spaced from the rim and extending transversely to the wiping bar one at each end of the wiping bar, said wiping bar and wiping sides being proportioned to wipe the sides and ends of brushes, said wiping bar and said wiping sides forming a U-shaped wiper disposed in communicating relation with the central portion of the can opening so that after the brush is dipped into the paint the U-shaped wiper is adapted to receive the brush during the withdrawal motion from the can, legs to support said wiping bar above the upper surface of the rim, said legs having first portions below the upper surface of the rim, said wiping sides forming inclined connections between the wiping bar disposed above the upper surface of the rim and the leg first portions below the upper surface of the rim, the juncture of said leg first portions and wiping sides forming drip inducing U-shapes laterally spaced from the rim in the zone of the wiping sides, the drip inducing U-shapes formed by the wiping sides and leg first portions extending in the direction which is generally opposite to that of the first mentioned U-shape and toward the portion of the rim generally behind the longitudinal wiping bar, said legs having second portions resting on said rim and connected to said first leg portions, and said legs having third portions frictionally attachable to portions of the can for securing said brush wiper in operative position, whereby the position of the wiping bar above the level of the upper rim surface and the lateral spacing of the wiping sides and the drip inducing zones from the rim tends to avoid paint from entering the rim during the wiping motion.

2. The structure recited in claim 1 wherein said can has ears for attaching thereto a can handle, said leg third portions form resilient clamps frictionally engaging said ears for also retaining the lid when the lid is on the can and during transit thereof, said leg third portions including terminal tab portions to aid in engaging and disengaging the clamps.

3. The structure recited in claim 2 wherein the drip inducing U-shapes are sufficiently large to wedge a paddle between the wiping sides and the leg first portions.

4. In combination, a paint can having a laterally extending rim defining an opening and adapted to frictionally retain a lid, said rim having upper and lower surfaces, and a paint brush wiper for detachable attachment to said paint can rim only, said brush wiper comprising a longitudinal wiping bar over the can opening, above the level of the rim, and with its ends laterally spaced from the rim, two wiping sides laterally spaced from the rim and extending transversely to the wiping bar one at each end of the wiping bar, said wiping bar and wiping sides being proportioned to wipe the sides and ends of brushes, said wiping bar and said wiping sides forming a U-shaped wiper disposed in communicating relation with the central portion of the can opening so that after the brush is dipped into the paint the U-shaped wiper is adapted to receive the brush during the withdrawal motion from the can opening, legs having first portions disposed below the upper surface of the rim to support said wiping bar above the upper surface of the rim, said wiping sides forming inclined connections between the wiping bar disposed above the upper surface of the rim and the leg first portions disposed below the upper surface of the rim, the junctures of said wiping sides and leg first portions forming drip inducing U-shapes in the planes of said wiping sides whereby the leg first portions and the drip inducing zones are also laterally spaced from the rim in the zone of the wiping sides, the drip inducing U-shapes formed by the wiping sides and the leg first portions extending in the direction which is generally opposite to that of the first mentioned U-shape and toward the portion of the rim generally behind the longitudinal wiping bar, said legs having second portions underlying the rim and connected to said leg first portions, said legs having third portions connected between said first and second portions and extending upwardly and overlying the rim, said legs having fourth portions extending from and connected to said third portions and outwardly of said rim to be grasped as a handle, said second and third leg portions (the portions underlying and overlying the rim) forming flexible, open ended clamps engageable and disengageable with said rim, whereby the position of the wiping bar above the level of the upper rim surface and the lateral spacing of the wiping sides and the drip inducing zones from the rim tends to avoid paint from entering the rim during the wiping motion and the open ended clamps permit the wiper to be added to the rim and removed therefrom by movement of the wiper generally parallel with the plane of the rim.

5. The structure recited in claim 4 wherein said wiping sides and said leg first portions are flexible and spaced sufficiently from the adjacent portion of the rim to define a wedging space for a paddle.

References Cited in the file of this patent

UNITED STATES PATENTS

| | | |
|---|---|---|
| 124,928 | Bailey | Mar. 26, 1872 |
| 515,369 | Saunders | Feb. 27, 1894 |
| 1,008,710 | Glaser | Nov. 14, 1911 |
| 1,928,995 | De Biasi | Oct. 3, 1933 |
| 2,004,285 | Kent et al. | June 11, 1935 |
| 2,196,614 | Spitz | Apr. 9, 1940 |
| 2,353,555 | Gore | July 11, 1944 |
| 2,578,233 | Entsminger | Dec. 11, 1951 |